United States Patent
Shen et al.

(10) Patent No.: US 11,271,675 B2
(45) Date of Patent: Mar. 8, 2022

(54) METHOD OF DOWNLINK CONTROL INFORMATION DETECTION, TRANSMISSION, TERMINAL AND NETWORK DEVICE

(71) Applicant: VIVO MOBILE COMMUNICATION CO., LTD., Chang'an Dongguan (CN)

(72) Inventors: Xiaodong Shen, Chang'an Dongguan (CN); Xueming Pan, Chang'an Dongguan (CN); Yu Ding, Chang'an Dongguan (CN); Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 95 days.

(21) Appl. No.: 16/634,208

(22) PCT Filed: Jul. 17, 2018

(86) PCT No.: PCT/CN2018/095965
§ 371 (c)(1),
(2) Date: Jan. 27, 2020

(87) PCT Pub. No.: WO2019/019938
PCT Pub. Date: Jan. 31, 2019

(65) Prior Publication Data
US 2020/0213036 A1 Jul. 2, 2020

(30) Foreign Application Priority Data
Jul. 28, 2017 (CN) .......................... 201710631718.4

(51) Int. Cl.
*H04L 1/00* (2006.01)
*H04L 5/00* (2006.01)
*H04W 72/04* (2009.01)

(52) U.S. Cl.
CPC .......... *H04L 1/0038* (2013.01); *H04L 1/0061* (2013.01); *H04L 5/0044* (2013.01); *H04W 72/042* (2013.01)

(58) Field of Classification Search
CPC ... H04L 1/0038; H04L 1/0061; H04L 5/0044; H04L 5/0053; H04L 5/0091; H04L 1/0045; H04W 72/042
See application file for complete search history.

(56) References Cited

U.S. PATENT DOCUMENTS

2011/0292887 A1* 12/2011 Baldemair ............ H04L 5/0053
370/329
2013/0010714 A1* 1/2013 Kim ...................... H04L 5/0092
370/329

(Continued)

FOREIGN PATENT DOCUMENTS

CN 102246548 A 11/2011
CN 102577222 A 7/2012

(Continued)

OTHER PUBLICATIONS

LG Electronics, Discussion on configurability of DCI contents, 3GPP TSG RAN WG1 Meeting #89, Hangzhou, P.R. China May 15-19, 2017, R1-1707633. (Year: 2017).*

(Continued)

*Primary Examiner* — Shailendra Kumar
(74) *Attorney, Agent, or Firm* — von Briesen & Roper, s.c.

(57) ABSTRACT

The present disclosure discloses a downlink control information detecting method, a downlink control information transmitting method, a terminal and a network device. The method includes: obtaining indication information for indicating a candidate downlink control information (DCI) payload size; according to the candidate DCI payload size indicated by the indication information, performing blind (Continued)

obtaining indication information for indicating candidate downlink control information (DCI) payload size — 11 according to the candidate DCI payload size indicated by the indication information, performing blind detection on a physical downlink control channel (PDCCH) and determining DCI transmitted on the PDCCH — 12 detection on a physical downlink control channel (PDCCH) and determining DCI transmitted in the PDCCH.

20 Claims, 4 Drawing Sheets

(56) References Cited

U.S. PATENT DOCUMENTS

| 2014/0146775 | A1 | 5/2014 | Guan et al. |
| 2014/0314012 | A1 | 10/2014 | Tang |
| 2018/0035411 | A1 | 2/2018 | Wang et al. |

FOREIGN PATENT DOCUMENTS

| CN | 102932090 | A | 2/2013 |
| CN | 103167615 | A | 6/2013 |
| CN | 104683069 | A | 6/2015 |
| CN | 105490779 | A | 4/2016 |
| CN | 105992378 | A | 10/2016 |
| CN | 106454694 | A | 2/2017 |
| EP | 2343934 | A1 | 7/2011 |

OTHER PUBLICATIONS

Ericsson, On Blind Detection of Downlink Control Channels, 3GPP TSG-RAN WG1 Ad hoc NR Meeting, Spokane, USA, Jan. 16-20, 2017, R1-1701118. (Year: 2017).*

MediaTek Inc., DCI Contents in NR, 3GPP TSG RAN WG1 Meeting #89, Hangzhou, China, May 15-19, 2017, R1-1707824. (Year: 2017).*

First Chinese Office Action Application No. 201710631718.4; dated Mar. 16, 2020.

Chinese Search Report Application No. 201710631718.4; dated Apr. 15, 2019.

European Search Report Application No. 18837603.2; dated Jun. 26, 2020.

International Search Report & Written Opinion related to Application No. PCT/CN2018/095965; dated Oct. 11, 2018.

Huawei, Hisilicon; "Codebook based transmission for UL MIMO", 3GPP TSG RAN WG1 Meeting #89, R1-1709206, Hangzhou, China, May 15, 2017-May 19, 2017.

Ericsson; "On Blind Detection of Downlink Control Channels", 3GPP TSG-RAN WG1 Ad hoc_NR Meeting, R1-1701118, Spokane, USA, Jan. 16, 2017-Jan. 20, 2017.

LG Electronics, "Discussion on configurability of $DC_I$ contents", 3GPP TSG RAN WG1 Meeting #89, R1-1707633, Hangzhou, P.R. China May 15, 2017-May 19, 2017.

Mediatek Inc., "DCI Contents in NR", 3GPP TSG RAN WG1 Meeting #89, R1-1707824, Hangzhou, China, May 15, 2017-May 19, 2017.

* cited by examiner

METHOD OF DOWNLINK CONTROL INFORMATION DETECTION, TRANSMISSION, TERMINAL AND NETWORK DEVICE

CROSS-REFERENCE TO RELATED APPLICATION

This application is a 35 U.S.C. § 371 U.S. national stage of International Application No. PCT/CN2018/095965 filed on Jul. 17, 2018, which claims priority of Chinese Patent Application No. 201710631718.4 filed on Jul. 28, 2017, which is incorporated herein by reference in its entirety.

TECHNICAL FIELD

The present disclosure relates to the field of communication technologies, and in particular, to a downlink control information detecting method, a downlink control information transmitting method, a terminal and a network device.

BACKGROUND

In the Long Term Evolution (LTE) system, and the future fifth generation (5-Generation, hereinafter referred to as 5G) communication system which may be also referred to as New Radio (hereinafter referred to as NR) system, in order to achieve more flexible channel design, terminal blind detection is introduced. Specifically, under the premise of information such as location of physical transmission resource where a location control signaling is located and size of the resource occupied by the location control signaling, the terminal performs tentative detection through various assumptions, until control signaling is correctly decoded.

In the LTE system, before the network device transmits a physical downlink control channel (hereinafter referred to as PDCCH), only some system information is transmitted. When the terminal receives the PDCCH transmitted by the base station, the terminal does not learn information such as number, size, positions of control channel elements (hereinafter referred to as CCE) occupied by the PDCCH and downlink control information (DCI) format transmitted by the PDCCH, and thus the terminal is required to perform blind detection on the PDCCH.

In the LTE system, the terminal blind detection refers to that the terminal finds a starting position of the CCE, and intercepts a guessed DCI length at the starting position of the CCE for decoding; if CRC of decoded information bits is the same as CRC carried in the PDCCH, determines that the information bits carried by the current PDCCH is downlink control information currently transmitted. Specifically, the terminal needs to determine which DCI format the PDCCH carries, and the terminal expects to obtain a certain DCI according to its current state. For example, when the terminal is in an idle state, the terminal expects to receive paging system information (hereinafter referred to as SI); when the terminal needs to transmit uplink data, the terminal expects to receive an uplink grant (hereinafter referred to as UL Grant); after the terminal initiates a random access procedure, the terminal expects to receive a random access channel response (hereinafter referred to as RACH Response) and so on. For different information, the terminal needs to use the corresponding Radio Network Temporary Identity (hereinafter referred to as RNTI) to perform Cyclic Redundancy Check (hereinafter referred to as CRC) with CCE information. If the check succeeds, the terminal learns that the information is required by itself, and then further parses content of corresponding DCI according to the modulation and coding manner.

If the terminal traverses all CCEs, it requires a lot of calculation. Therefore, available CCEs in the LTE system are divided into two search spaces, namely a common search space and a specific search space. Data transmitted in the common search space mainly includes system information (SI), Random Access Response (RAR), paging, and the like, and each terminal searches the common search space. The location of the common search space is fixed, on CCE0-CCE16, and the Aggregation Level (AL) for the common search space is only 4 and 8, so when the terminal searches the common search space, starting from CCE0, the terminal searches for 4 times as AL=4 and then searches for 2 times as AL=8. For the specific search space, search starting points of various terminals are different, and the AL of the search space is divided into four types, namely 1, 2, 4, and 8. Then, the terminal searches for 6 times as AL=1, searches for 6 times as AL=2, searches for 2 times as A=4, and searches for 2 times as AL=8. The number of blind detections performed by the terminal include searching for 6 times in the common search space and searching for 16 times in the specific search space. In the terminal-specific search space, the DCI format for the terminal at the same time has only two payload sizes, so the terminal needs to search twice, that is, 32 times.

In the NR system, due to the introduction of new DCI format, the DCI formats are more than that in the LTE system. The payload sizes of different DCI formats are quite different, and it is difficult to align payload sizes of different DCI formats to one or two types of payload sized by padding, which leads to high complexity of blind detection and an increase in the number of blind detections.

SUMMARY

In a first aspect, an embodiment of the present disclosure provides a downlink control information detecting method, applied to a terminal, and including:

obtaining indication information for indicating a candidate downlink control information (DCI) payload size;

according to the candidate DCI payload size indicated by the indication information, performing blind detection on a physical downlink control channel (PDCCH) and determining DCI transmitted in the PDCCH.

In a second aspect, an embodiment of the present disclosure provides a terminal including:

a first obtaining module used to obtain indication information for indicating candidate downlink control information (DCI) payload size;

a processing module used to perform blind detection on a physical downlink control channel (PDCCH) according to the candidate DCI payload size indicated by the indication information, and determine DCI transmitted on the PDCCH.

In a third aspect, an embodiment of the present disclosure provides a terminal including: a processor, a memory and a computer program stored on the memory and executable on the processor. The computer program is executed by the processor to implement steps of the above downlink control information detecting method.

In a fourth aspect, an embodiment of the present disclosure provides a computer readable storage medium including a computer program stored thereon. The computer program is executed by a processor to implement steps of the above downlink control information detecting method.

In a fifth aspect, an embodiment of the present disclosure provides a downlink control information transmitting method, applied to a network device, including:

transmitting indication information for indicating candidate downlink control information (DCI) payload size to a terminal;

transmitting a DCI corresponding to the indication information to the terminal by a physical downlink control channel (PDCCH).

In a sixth aspect, an embodiment of the present disclosure provides a network device including:

a first transmission module used to transmit indication information for indicating candidate downlink control information (DCI) payload size to a terminal;

a second transmission module used to transmit a DCI corresponding to the indication information to the terminal by a physical downlink control channel (PDCCH).

In a seventh aspect, an embodiment of the present disclosure provides a network device including: a processor, a memory and a computer program stored on the memory and executable on the processor. The computer program is executed by the processor to implement steps of the downlink control information transmitting method.

In an eight seventh aspect, an embodiment of the present disclosure provides a computer readable storage medium including a computer program stored thereon. The computer program is executed by a processor to implement steps of the downlink control information transmitting method.

BRIEF DESCRIPTION OF THE DRAWINGS

To describe the technical solutions in the embodiments of the application more clear, brief descriptions of attached figures needing to be used during illustration of embodiments in the application will be provided in the following. It is obvious that, attached figures in the following descriptions are only some embodiments of the application. For persons having ordinary skill in the art, other attached figures may also be obtained based on these attached figures, without paying creative work.

DETAILED DESCRIPTION

Figure 1:
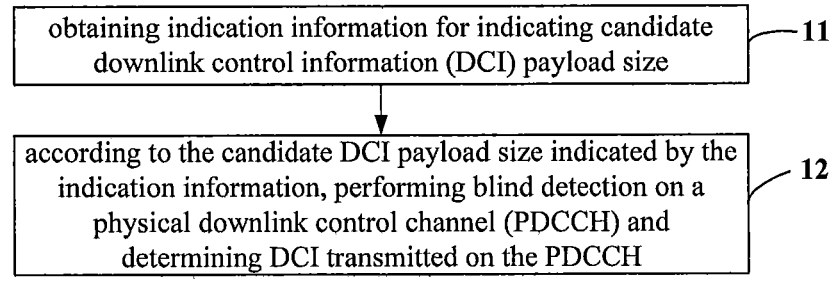
FIG. 1 is a flowchart illustrating a downlink control information detecting method according to an embodiment of the present disclosure.

Exemplary embodiments of the present disclosure will be described in details hereinafter accompanying with attached drawings in the embodiments of the present disclosure. Although exemplary embodiments of the present disclosure are shown in the drawings, it should be understood that the present disclosure may be implemented in various forms and should not be limited by the embodiments described herein. On the contrary, these embodiments are provided to enable a thorough understanding of the present disclosure and to fully convey the scope of the present disclosure to those skilled in the art.

The terms "first", "second" and the like in the specification and claims of the present application are merely used to distinguish similar objects, and are not necessarily used to describe a particular order or order. It is to be understood that the data so used may be interchanged where appropriate, such that the embodiments of the present application described herein can be implemented, for example, in a sequence other than those illustrated or described herein. In addition, the term "including", "include" or any variants thereof is intended to cover a non-exclusive contain. For example, a process, method, system, product, or device that includes a series of steps or units, is not necessarily limited to those steps or units and may include other steps or units which are not explicitly listed or inherent to such processes, methods, products or devices.

As shown in FIG. 1, a downlink control information detecting method according to an embodiment of the present disclosure is applied to a terminal, and specifically includes the following steps:

Step 11: obtaining indication information for indicating candidate downlink control information (DCI) payload size.

The DCI payload size refers to the size (bit number) of a padded DCI. This padding may be for the purpose of aligning different DCI sizes, or may be aligned according to the size of the network configuration. The indication information is used to indicate candidate DCI payload size, i.e., indicating probable DCI payload sizes. The candidate DCI payload size indicated by the indication information may be one DCI payload size or several DCI payload sizes.

Step 12: according to the candidate DCI payload size indicated by the indication information, performing blind detection on a physical downlink control channel (PDCCH) and determining DCI transmitted on the PDCCH.

After obtaining the indication information, the terminal can learn the probable DCI payload size of current PDCCH transmission. The PDCCH is blindly checked according to probable DCI payload size of transmission, thereby determining DCI transmitted on the PDCCH. In this way, the blind detection is performed according to the candidate DCI payload size indicated by the indication information, and the blind detection is not performed according to all supported DCI payload sizes, which can reduce the number of blind detections and reduce the complexity of blind detections.

Specifically, the step 11 includes: receiving first indication information that is configured and transmitted by the network device. The first indication information is used to indicate at least one candidate DCI payload size corresponding to the terminal, or the first indication information is used to indicate at least one candidate DCI payload size corresponding to each control resource set of the terminal.

Figure 2:
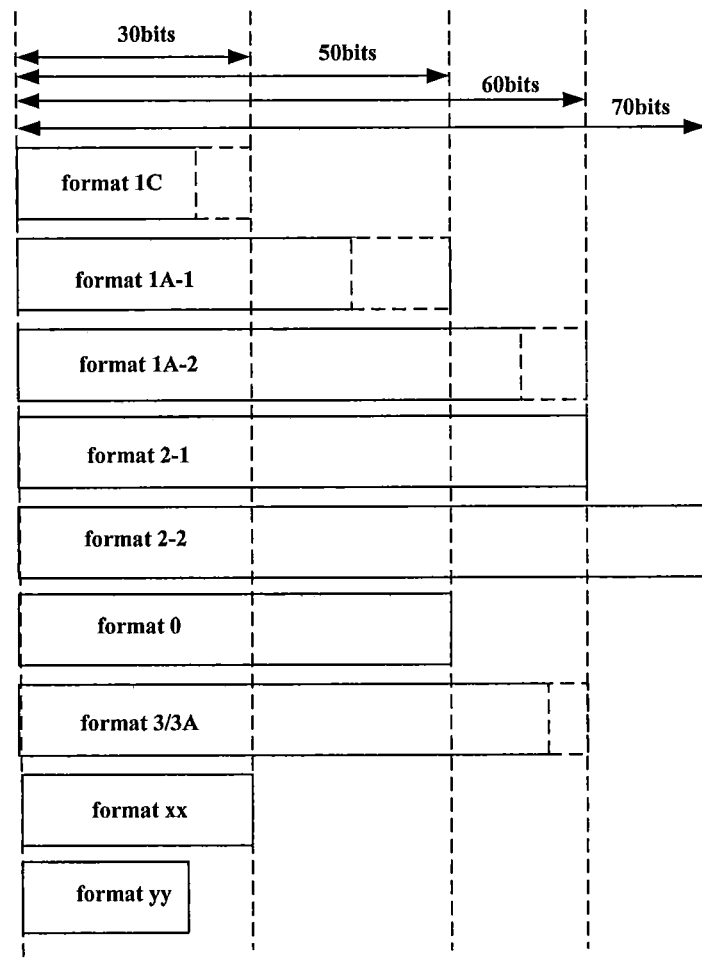
FIG. 2 is a schematic diagram showing sizes of information bits of different DCI formats in the NR system.
Figure 3:
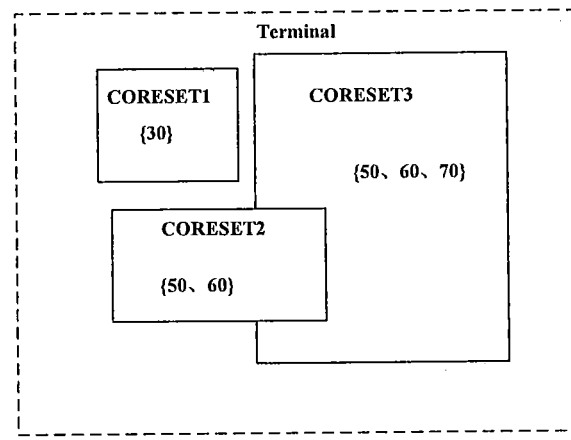
FIG. 3 is a schematic diagram showing DCI payload sizes configured by a network device for different CORSETs of an identical terminal.

Specifically, in the NR system, the supported DCI formats are more than the DCI formats in the LTE system. Accordingly, DCI information bits supported by different DCI formats in the NR system may also increase. As shown in FIG. 2, the DCI formats include: format 1C, format 1A-1, format 1A-2, format 2-1, format 2-2, format 0, format 3/3A, format xx, and format yy. The information bits of various DCI formats differ greatly. The network device may configure a set of candidate DCI payload sizes for each terminal, or the network device may configure a set of candidate DCI payload sizes for each control resource set (hereinafter referred to as CORESET) of each terminal. As shown in FIG. 3, a candidate DCI payload size configured by the network device for CORESET1 of one terminal is 30 bits; candidate payload sizes configured by the network device for CORESET2 of the terminal include 50 bits and 60 bits; and, candidate payload sizes configured by the network device for CORESET3 of the terminal include 50 bits, 60 bits and 70 bits.

Further, CORESET is a set of time-frequency resources introduced in the NR system, that is, the terminal performs PDCCH detection in the corresponding CORESET. Specifically, one or more CORESETs exist in a control region of one slot, and the terminal may detect PDCCH in one or more CORESETs. The PDCCH occupies one or more (for example, 1, 2, 4, and 8) CCEs for transmission, that is, mapping from PDCCH to the time-frequency resource is based on CCE structure. A basic resource unit of the CCE is a resource element group (hereinafter referred to as REG), and one CCE is composed of a certain number of REGs (i.e., composed of 6 REGs). In other words, CORESET is composed of a group of REGs. One REG is composed of one RB (i.e., 12 consecutive subcarriers) in the frequency domain and one Orthogonal Frequency Division Multiplexing (OFDM) symbol in the time domain. The time-frequency position configuration of the CORESET may be notified by one or more of the following combinations: time-frequency position configuration information of the CORESET may be notified by high-level signaling; or, the time-frequency position configuration information of the CORESET may be notified by broadcast channel and system information; the time-frequency position configuration information of the CORESET may be pre-defined based on one or more of information such as system bandwidth, subcarrier spacing, antenna configuration, and carrier frequency. Further, the network device may configure candidate DCI payload sizes for different terminals by high layer signaling; accordingly, the terminal may receive, by the high layer signaling, the first indication information that is configured and transmitted by the network device.

Further, when CORESET configuration, DCI format, and DCI information bits of the terminal are changed, the network device and the terminal may determine one or more default DCI payload sizes corresponding to the terminal by means of predefined agreement, pre-configuration, or the like. Specifically, the first indication information obtained by the terminal may further indicate at least one default DCI payload size. The default DCI payload size may be dynamically changed according to transmission scenario, transmission service, or the like, or defined by a standard. Thus, when the CORESET configuration, the DCI format and the DCI information bits of the terminal are changed, the candidate DCI payload size configured by the network device for the terminal may be invalid, and then, the terminal performs blind detection on the PDCCH according to the default DCI payload size, thereby preventing the problem of leak detection caused by performing blind detection according to the invalid candidate DCI payload size. In other words, when the terminal blindly detects the PDCCH, in addition to performing blind detection according to the candidate DCI payload size configured by the network device, the terminal also needs to perform blind detection according to the default DCI payload size in a certain scenario, thereby ensuring the accuracy of PDCCH blind detection.

Further, the step 12 in the embodiment of the present disclosure may be specifically implemented by performing the following steps: performing blind detection on the PDCCH according to the candidate DCI payload size indicated by the indication information, thereby obtaining a bit string; parsing indication field in the bit string, and determining DCI format of DCI transmitted in the PDCCH according to a parsed result; and parsing the DCI carried in the bit string according to the DCI format.

The DCI transmitted by the network device is transmitted after being padded to a certain DCI payload size, thus, when parsing the DCI, the terminal needs to adopt an additional mechanism to recover original DCI, thereby obtaining an actual DCI format of the DCI and then learning corresponding information bits of the actual DCI format. In other words, after a bit string is obtained by performing blind detection on the PDCCH according to the candidate DCI payload size indicated by the indication information, an additional mechanism is required to detect valid bits of the bit string.

The indication field includes a specific target field and a Cyclic Redundancy Check (CRC) field. Specifically, the step of parsing indication field in the bit string and determining DCI format of DCI transmitted in the PDCCH according to a parsed result, may be implemented in the following modes.

Mode 1: parsing a specific target field in the bit string, and determining DCI format of DCI transmitted in the PDCCH according to a parsed result.

Figure 4:
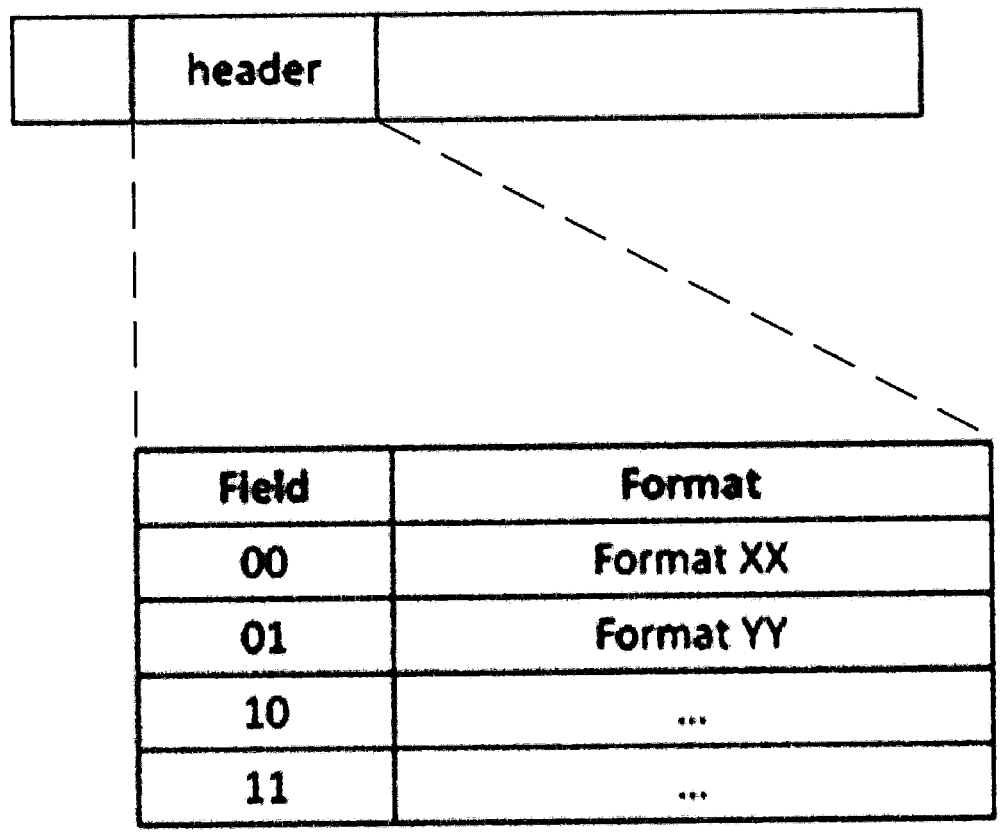
FIG. 4 is a schematic diagram of a header field according to an embodiment of the present disclosure.

The specific target field is a certain field in the DCI. Specifically, the specific target field may be configured at a header position of the DCI, and then the specific target field may be referred to as header field. After the terminal performs blind detection on PDCCH according to the candidate DCI payload size indicated by the indication information, the terminal determines DCI payload size of the DCI and then obtains a decoded bit string by decoding. Then, format of the DCI is learn through the header field, thereby obtaining corresponding information bits of the DCI format. The header field is used to indicate the format of the DCI. Specifically, as shown in FIG. 4, when the header field is 00, it indicates that the DCI format is format xx; and, when the header field is 01, it indicates that the DCI format is format yy.

Mode 2: descrambling the CRC field in the bit string by means of cyclic redundancy check (CRC), and determining DCI format of DCI transmitted in the PDCCH according to a descrambling result.

Figure 5:
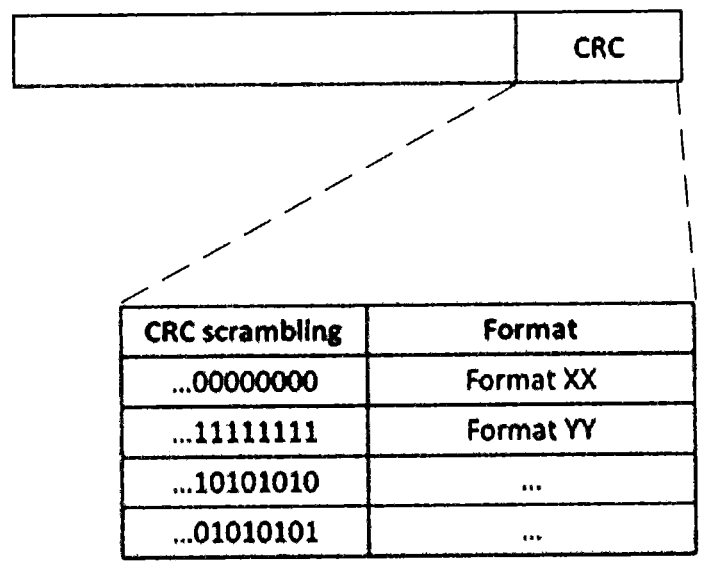
FIG. 5 is a schematic diagram of a CRC field according to an embodiment of the present disclosure.

The extra information of the DCI format can be carried by scrambling, by the network device, the CRC field in the DCI. After the terminal performs blind detection on PDCCH according to the candidate DCI payload size indicated by the indication information, the terminal determines DCI payload size of the DCI and then obtains a decoded bit string by decoding. Then, format of the DCI is learn by descrambling the CRC field in the bit string, thereby obtaining corresponding information bits of the DCI format. As shown in FIG. 5, when the descrambling CRC field is 00000000, it indicates that the DCI format is format xx; and, when he descrambling CRC field is 11111111, it indicates that the DCI format is format yy.

Mode 3: descrambling the CRC field in the bit string by means of cyclic redundancy check (CRC), and determining DCI format of DCI transmitted in the PDCCH according to a descrambling result; further, parsing a specific target field in the bit string and determining whether DCI format is correct according to a parsed result.

Further, when it is determined that the DCI format is correct according to the parsed result, parsing DCI carried in the bit string according to the DCI format.

This mode is a first one of combination modes of the first mode and the second mode, and determines the DCI format by means of descrambling the CRC field supplemented by the header field. Specifically, different DCI formats are treated differently: when a difference between a DCI payload size and actual information bits of the transmitted DCI is insufficient to introduce an additional field (header), then, the additional field is not introduced; when a difference between a DCI payload size and actual information bits of the transmitted DCI is sufficient to introduce an additional field (header), then DCI includes the additional field (header) for the terminal to determine whether the DCI format is correct by cross-checking with the descrambling CRC.

Mode 4: descrambling the CRC field in the bit string by means of cyclic redundancy check (CRC), determining whether the bit string includes the specific target field; when the bit string does not include the specific target field, determining that DCI format of DCI transmitted in the PDCCH is default DCI format; when the bit string includes the specific target field, parsing the specific target field in the bit string, and determining DCI format of DCI transmitted in the PDCCH according to a parsed result.

This mode is a second one of combination modes of the mode 1 and mode 2, descrambles the CRC field to indicate whether an additional header field is introduced, and then the DCI format is determined with the additional header field. Specifically, after the terminal performs blind detection on PDCCH according to the candidate DCI payload size indicated by the indication information, the terminal determines DCI payload size of the DCI and then obtains a decoded bit string by decoding. Then, the CRC field in the bit string is descrambled, and information carried in the CRC field is used to determine whether the DCI includes an additional field (header) for indicating DCI format. When the information carried in the CRC field indicates that the DCI does not include an additional field, then the terminal receives according to the default DCI format. When the information carried in the CRC field indicates that the DCI includes an additional field for indicating the DCI format, the terminal reads the field to obtain the DCI format.

Mode 5: parsing a specific target field in the bit string and descrambling the CRC field in the bit string by means of cyclic redundancy check (CRC), and determining DCI format of DCI transmitted in the PDCCH.

This mode is a third one of combination modes of the mode 1 and mode 2, i.e., the DCI format is indicated by two types of fields, one type includes an additional field (header) introduced in DCI, and the other type includes CRC field.

Further, the step of parsing a specific target field in the bit string, and determining DCI format of DCI transmitted in the PDCCH according to a parsed result includes the following steps: obtaining a correspondence relationship between the candidate DCI payload size and the DCI format; determining indication field in the bit string according to the correspondence relationship; parsing the indication field and determining the DCI format of the DCI transmitted in the PDCCH according to the parsing result.

Specifically, the step of obtaining the correspondence relationship between the DCI payload size and the DCI format includes: obtaining first correspondence relationship information in a predefined manner. The first correspondence relationship information is used to indicate correspondence relationship between all candidate DCI payload sizes and DCI formats. This mode is an implicit indication mode, and the terminal can learn the correspondence relationship between all candidate DCI payload sizes and the DCI formats in a mode defined in a standard, or the terminal can receive the first correspondence information transmitted by the network device through system information, high layer signaling, etc., when the terminal accesses.

Or, the step of obtaining the correspondence relationship between the DCI payload size and the DCI format includes: receiving second correspondence information that is configured and transmitted by the network device. The second correspondence information is used to indicate a correspondence relationship between the candidate DCI payload size indicated by the indication information and the DCI format. This mode can be applied to the following scenario: when the blind detection capability of the terminal is not particularly high, the network device may reduce configuration of probable DCI payload sizes, thereby reducing the number of blind detections performed by the terminal.

Further, the step of determining the indication field in the bit string according to the above correspondence relationship includes: according to the candidate DCI payload size indicated by the indication information, determining a first candidate DCI payload size of the DCI transmitted in the PDCCH; according to the correspondence relationship between the candidate DCI payload size and the DCI format, determining number information of first format corresponding to the first candidate DCI payload size; according to the number information, determining bit number of the indication field in the bit string.

In other words, the network device determines a bit length of the header field according to the number of DCI formats corresponding to each DCI payload size. Specifically, the header field may take values in the order from 0 according to configured DCI formats, or, the header field may take values in the order of information bit sizes in the DCI formats. An example is provided in the following table.

| DCI format | Information bits size | DCI payload size | Header bit number | Header field |
|---|---|---|---|---|
| format 0 | 25 | 30 | 1-bit | '0' |
| format 1A-1 | 30 | | | '1' |
| format 1A-2 | 40 | 45 | 1-bit | '0' |
| format 3 | 35 | | | '1' |
| format 2-1 | 50 | 60 | 1-bit | '0' |
| format 2-2 | 60 | | | '1' |

The DCI payload sizes in the table are set to three types including 30, 45, and 60. The information bit sizes of different DCI formats are different. For example, the information bit size of format0 is 25 bits, and the information bit size of format 1A-1 is 30-bit. DCI payload sizes corresponding to format0 and format 1A-1 are 30 bits, then the 30-bit DCI payload size corresponds to two different DCI formats, and an additional 1-bit header field is required. When the value of the header field is 0, it indicates that the DCI format is format0. When the value of the header field is 1, it indicates that the DCI format is format 1A-1.

Similarly, the manner in which the CRC field indicates different DCI formats is similar to the manner in which the header field indicates the DCI format. Specifically, the CRC field may take values in the order from 0 according to configured DCI formats, or, the CRC field may take values in the order of information bit sizes in the DCI formats. An example is provided in the following table.

| DCI format | Information bits size | DCI payload size | CRC scrambling |
| --- | --- | --- | --- |
| format 0 | 25 | 30 | 00000000 |
| format 1A-1 | 30 | | 00000001 |
| format 1A-2 | 40 | 45 | 00000000 |
| format 3 | 35 | | 00000001 |
| format 2-1 | 50 | 60 | 00000000 |
| format 2-2 | 60 | | 00000001 |

The DCI payload sizes in the table are set to three types including 30, 45, and 60. The information bit sizes of different DCI formats are different. For example, the information bit size of format0 is 25 bits, and the information bit size of format 1A-1 is 30-bits. DCI payload sizes corresponding to format0 and format 1A-1 are 30 bits, then the 30-bit DCI payload size corresponds to two different DCI formats. When the value of the CRC field is 00000000, it indicates that the DCI format is format0. When the value of the CRC field is 00000001, it indicates that the DCI format is format 1A-1.

The above describes that the indication field is determined according to the correspondence relationship between the candidate DCI payload size and the DCI format. The indication field may also be a predefined header field and/or a CRC field. That is, values of the header field and/or the CRC field correspond to different DCI formats. The correspondence relationship may be predefined in the protocol, or may be configured by the network device for the terminal.

In the downlink control information detecting method of the embodiment of the present disclosure, the terminal obtains the indication information for indicating the candidate DCI payload size, and performs blind detection on the PDCCH according to the candidate DCI payload size, thereby reducing blind detection number and reducing the blind detection complexity.

The above embodiment describes the downlink control information detecting method in different scenarios. The terminal corresponding thereto will be further introduced hereinafter with reference to the accompanying drawings.

Figure 6:
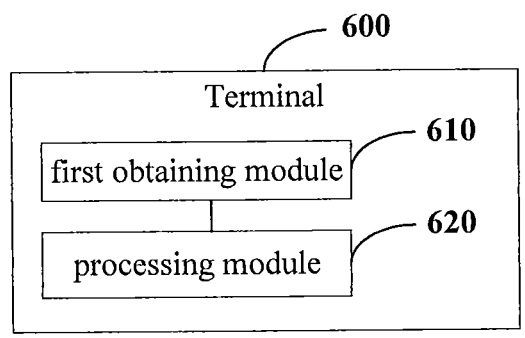
FIG. 6 is a schematic block diagram of a terminal according to an embodiment of the present disclosure.

As shown in FIG. 6, the terminal 600 of the embodiment of the present disclosure can implement details of the method in the above embodiment and achieve the same effects, i.e., obtaining the indication information for indicating the DCI payload size of the candidate downlink control information, performing blind detection on the PDCCH according to the candidate DCI payload size indicated by the indication information, and determining DCI transmitted in the PDCCH. The terminal 600 specifically includes the following functional modules.

A first obtaining module 610 is used to obtain indication information for indicating candidate downlink control information (DCI) payload size.

A processing module 620 is used to perform blind detection on a physical downlink control channel (PDCCH) according to the candidate DCI payload size indicated by the indication information, and determine DCI transmitted on the PDCCH.

The first obtaining module 610 includes:
a first receiving submodule, used to receive first indication information that is configured and transmitted by the network device. The first indication information is used to indicate at least one candidate DCI payload size corresponding to the terminal, or the first indication information is used to indicate at least one candidate DCI payload size corresponding to each control resource set of the terminal.

The first receiving submodule is specifically used to, receive, by high layer signaling, the first indication information that is configured and transmitted by the network device.

The first indication information is used to indicate at least one default DCI payload size.

The processing module 620 includes:
a blind detection sub-module, used to perform blind detection on the PDCCH according to the candidate DCI payload size indicated by the indication information, to obtain a bit string;
a processing submodule, used to parse an indication field in the bit string, and determine a DCI format of DCI transmitted in the PDCCH according to a parsing result;
a parsing submodule, used to parse DCI carried in the bit string according to the DCI format.

The processing submodule includes:
a first processing unit used to parse a specific target field in the bit string, and determine DCI format of the DCI transmitted in the PDCCH according to a parsing result.

The processing submodule includes:
a second processing unit used to descramble the CRC field in the bit string by means of cyclic redundancy check (CRC), and determine DCI format of DCI transmitted in the PDCCH according to a descrambling result.

The processing submodule further includes:
a first parsing unit, used to parse a specific target field in the bit string, and determine whether the DCI format is correct according to a parsing result.

The parsing submodule includes:
a second parsing unit used to parse the DCI carried in the bit string according to the DCI format when determining that the DCI format is correct according to the parsing result.

The processing submodule includes:
a descrambling unit, used to descramble the CRC field in the bit string by means of cyclic redundancy check (CRC), determine whether the bit string includes the specific target field;
a third processing unit, used to determine that DCI format of DCI transmitted in the PDCCH is default DCI format when the bit string does not include the specific target field;
a fourth processing unit, used to parse the specific target field in the bit string when the bit string includes the specific target field, and determine DCI format of DCI transmitted in the PDCCH according to a parsed result.

The processing submodule includes:
a fifth processing unit, used to parse the specific target field in the bit string and descramble the CRC field in the bit string by means of cyclic redundancy check (CRC), and determine the DCI format of DCI transmitted in the PDCCH.

The terminal 600 further includes:
a second obtaining module, used to obtain a correspondence relationship between the candidate DCI payload size and the DCI format;
a determining module, used to determine indication field in the bit string according to the correspondence relationship;
a parsing module, used to parse the indication field and determine the DCI format of the DCI transmitted in the PDCCH according to the parsing result.

The second obtaining module includes:
an obtaining sub-module, used to obtain first correspondence relationship information by a predefined manner; where the first correspondence relationship information is used to indicate correspondence relationship between all candidate DCI payload sizes and DCI formats;

or, a second receiving submodule used to receive second correspondence information that is configured and transmitted by the network device; where the second correspondence information is used to indicate a correspondence relationship between the candidate DCI payload size indicated by the indication information and the DCI format.

The terminal 600 further includes:

a first determining module, used to determine a first candidate DCI payload size of the DCI transmitted in the PDCCH according to the candidate DCI payload size indicated by the indication information;

a second determining module, used to determine number information of first format corresponding to the first candidate DCI payload size according to the correspondence relationship between the candidate DCI payload size and the DCI format;

a third determining module, used to determine bit number of the indication field in the bit string according to the number information.

It is to be noted that the terminal in the embodiment of the present disclosure obtains the indication information for indicating the candidate DCI payload size, and performs blind detection on the PDCCH according to the candidate DCI payload size, thereby reducing the number of blind detection and reduce the blind detection complexity.

In order to better achieve the above object, an embodiment of the present disclosure further provides a terminal, including a processor, a memory, and a computer program stored on the memory and executable on the processor. The processor implements the computer program to implement steps in the above downlink control information detecting method. An embodiment of the present disclosure further provides a computer readable storage medium including a computer program stored thereon. The computer program is executed by a processor to implement the steps of the downlink control information detecting method as described above.

Figure 7:
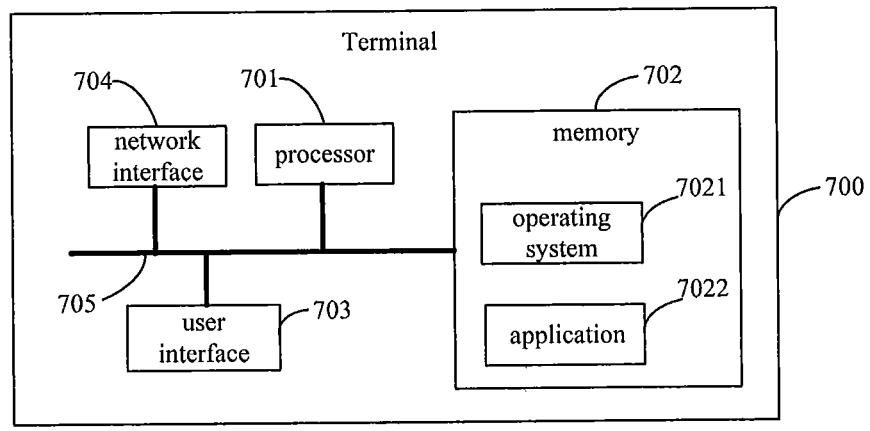
FIG. 7 is a block diagram of a terminal according to an embodiment of the present disclosure.

Specifically, FIG. 7 is a block diagram of a terminal 700 of another embodiment of the present disclosure. As shown in FIG. 7, the terminal includes at least one processor 701, a memory 702, a user interface 703, and a network interface 704. The various components in the terminal 700 are coupled together by a bus system 705. It will be appreciated that the bus system 705 is used to implement connection communication between these components. The bus system 705 includes a power bus, a control bus, and a status signal bus in addition to the data bus. However, for clarity of description, various buses are labeled as the bus system 705 in FIG. 7.

The user interface 703 may include a display device or a clicking device (i.e., a touchpad or a touch screen).

It is to be understood that the memory 702 in an embodiment of the present disclosure may be a volatile memory or a non-volatile memory, or may include both volatile memory and non-volatile memory. The non-volatile memory may be a read-only memory (ROM), a programmable read only memory (PROM), an erasable PROM (EPROM), or an electrically EPROM (EEPROM) or flash memory. The volatile memory may be a Random Access Memory (RAM) that acts as an external cache. By way of example and not limitation, many forms of RAM are available, such as static random access memory (SRAM), dynamic RAM (DRAM), synchronous DRAM (SDRAM), Double Data Rate SDRAM (DDRSDRAM), Enhanced SDRAM (ESDRAM), Synchlink DRAM (SLDRAM) and Direct Rambus RAM (DRRAM). The memory 702 of the systems and methods described herein is intended to include, without being limited to, these and any other suitable types of memory.

In some implementations, the memory 702 stores elements, such as executable modules, data structures, a subset thereof, or their extended set: operating system 7021 and application 7022.

The operating system 7021 includes various system programs, such as a framework layer, a core library layer, a driver layer, for implementing various basic services and processing hardware-based tasks. The application 7022 includes various applications, such as a media player, a browser, for implementing various application services. A program implementing the method of the embodiment of the present disclosure may be included in the application 7022.

In an embodiment of the present disclosure, the terminal 700 further includes: a computer program stored on the memory 702 and executable on the processor 701. Specifically, the computer program may be a computer program in the application 7022, and the computer program is executed by the processor 701 to implement the following steps: obtaining indication information for indicating candidate downlink control information (DCI) payload size; according to the candidate DCI payload size indicated by the indication information, performing blind detection on a physical downlink control channel (PDCCH) and determining DCI transmitted on the PDCCH.

The method disclosed in the above embodiment of the present disclosure may be applied to the processor 701 or implemented by the processor 701. The processor 701 may be an integrated circuit chip with signal processing capabilities. In the implementation process, each step of the foregoing method may be completed by a hardware integrated logic circuit in the processor 701 or an instruction in a form of software. The processor 701 may be a general-purpose processor, a digital signal processor (DSP), an application specific integrated circuit (ASIC), a field programmable gate array (FPGA), or other programmable logic devices, discrete gates or transistor logic devices, discrete hardware components, which can implement or carry out the methods, steps, and logical block diagrams disclosed in the embodiment of the present disclosure. The general purpose processor may be a microprocessor or any conventional processor. The steps of the method disclosed in connection with the embodiment of the present disclosure may be directly implemented by the hardware decoding processor, or may be performed by a combination of hardware and software modules in the decoding processor. The software module may be located in a conventional storage medium such as random access memory, flash memory, read only memory, programmable read only memory or electrically erasable programmable memory, registers. The storage medium is located in the memory 702, and the processor 701 reads information in the memory 702 and completes the steps of the above method in combination with its hardware.

It will be appreciated that the embodiments described herein may be implemented in hardware, software, firmware, middleware, microcode, or a combination thereof. For hardware implementation, the processing unit may be implemented in one or more Application Specific Integrated Circuits (ASICs), Digital Signal Processing (DSP), DSP Device (DSPD), programmable Programmable Logic Device (PLD), Field-Programmable Gate Array (FPGA), general purpose processor, controller, microcontroller, microprocessor, other electronic unit for performing the functions described herein or a combination thereof.

For a software implementation, the techniques described herein may be implemented by performing functions of modules (i.e., procedures, functions) described herein. The software codes may be stored in the memory and executed by the processor. The memory may be implemented in the processor or external to the processor.

Specifically, when the computer program is executed by the processor 701, the following steps may be implemented: receiving first indication information that is configured and transmitted by the network device. The first indication information is used to indicate at least one candidate DCI payload size corresponding to the terminal, or the first indication information is used to indicate at least one candidate DCI payload size corresponding to each control resource set of the terminal.

Specifically, when the computer program is executed by the processor 701, the following steps may be implemented: receiving, by high layer signaling, the first indication information that is configured and transmitted by the network device.

Specifically, the first indication information is further used to indicate at least one default DCI payload size.

Specifically, when the computer program is executed by the processor 701, the following steps may be implemented: performing blind detection on the PDCCH according to the candidate DCI payload size indicated by the indication information, to obtain a bit string;

parsing an indication field in the bit string, and determining DCI format of DCI transmitted in the PDCCH according to a parsing result;

parsing DCI carried in the bit string according to the DCI format.

Specifically, when the computer program is executed by the processor 701, the following steps may be implemented: parsing a specific target field in the bit string, and determining DCI format of DCI transmitted in the PDCCH according to the parsing result.

Specifically, when the computer program is executed by the processor 701, the following steps may be implemented: descrambling the CRC field in the bit string by means of cyclic redundancy check (CRC), and determining the DCI format of the DCI transmitted in the PDCCH according to the descrambling result.

Specifically, when the computer program is executed by the processor 701, the following steps may be implemented: parsing a specific target field in the bit string, and determining whether the DCI format is correct according to the parsing result.

The step of parsing the DCI carried in the bit string according to the DCI format includes:

when determining that the DCI format is correct according to the parsing result, parsing the DCI carried in the bit string according to the DCI format.

Specifically, when the computer program is executed by the processor 701, the following steps may be implemented: descrambling a CRC field in the bit string by means of CRC, and determining whether the bit string includes a specific target field;

when determining that the bit string does not include a specific target field, determining that the DCI format of the DCI transmitted in the PDCCH is the default DCI format;

when determining that the bit string includes a specific target field, parsing the specific target field in the bit string, and determining the DCI format of the DCI transmitted in the PDCCH according to the parsing result.

Specifically, when the computer program is executed by the processor 701, the following steps may be implemented: parsing a specific target field in the bit string and descrambling the CRC field in the bit string by means of CRC, and determining DCI format of DCI transmitted in the PDCCH.

Specifically, when the computer program is executed by the processor 701, the following steps may be implemented: obtaining a correspondence relationship between the candidate DCI payload size and the DCI format; determining indication field in the bit string according to the correspondence relationship; parsing the indication field and determining the DCI format of the DCI transmitted in the PDCCH according to the parsing result.

Specifically, when the computer program is executed by the processor 701, the following steps may be implemented: obtaining first correspondence relationship information by a predefined manner, where the first correspondence relationship information is used to indicate correspondence relationship between all candidate DCI payload sizes and DCI formats;

or, receiving second correspondence information that is configured and transmitted by the network device, where the second correspondence information is used to indicate a correspondence relationship between the candidate DCI payload size indicated by the indication information and the DCI format.

Specifically, when the computer program is executed by the processor 701, the following steps may be further implemented: determining a first candidate DCI payload size of the DCI transmitted in the PDCCH according to the candidate DCI payload size indicated by the indication information;

determining number information of first format corresponding to the first candidate DCI payload size according to the correspondence relationship between the candidate DCI payload size and the DCI format; and determine bit number of the indication field in the bit string according to the number information.

The terminal may be a wireless terminal or a wired terminal. The wireless terminal may be a device that provides voice and/or other service data connectivity to the user, a handheld device with a wireless connection function, or other processing device connected to a wireless modem. The wireless terminal may communicate with one or more core networks via a Radio Access Network (RAN). The wireless terminal may be a mobile terminal, such as a mobile phone (or "cellular" phone) and a computer with the mobile terminal, such as a portable, pocket, handheld, computer built-in or in-vehicle mobile device that exchanges language and/or data with the wireless access network. For example, Personal Communication Service (PCS) telephone, cordless telephone, Session Initiation Protocol (SIP) telephone, Wireless Local Loop (WLL) station, personal digital assistant (PDA). The wireless terminal may also be referred to as a system, a subscriber unit, a subscriber station, a mobile station, a mobile, a remote station, a remote terminal, an access terminal, user terminal, user agent, user device or user equipment, which are not limited herein.

The terminal of the embodiment of the present disclosure obtains the indication information for indicating the candidate DCI payload size, and performs blind detection on the PDCCH according to the candidate DCI payload size, thereby reducing the number of blind detection and reduce the blind detection complexity.

The above embodiment describes the downlink control information detecting method of the present disclosure from the terminal side. The following embodiment will further describes the downlink control information transmitting method on the network device in conjunction with the accompanying drawings.

Figure 8:
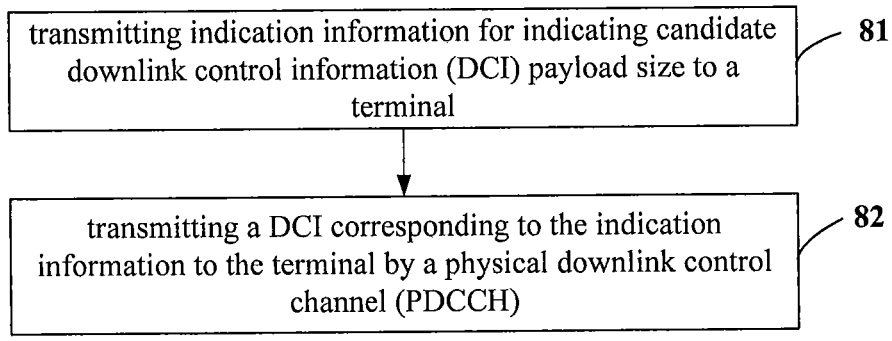
FIG. 8 is a flowchart illustrating a downlink control information transmitting method according to an embodiment of the present disclosure.

As shown in FIG. 8, a downlink control information transmitting method of an embodiment of the present disclosure is applied to the network device, and specifically includes the following steps.

Step 81: transmitting indication information for indicating candidate downlink control information (DCI) payload size to a terminal.

The DCI payload size refers to the size (bit number) of a padded DCI. This padding may be for the purpose of aligning different DCI sizes, or may be aligned according to the size of the network configuration. The candidate DCI payload sizes are for different terminals. Since different DCI payload sizes may be configured for different terminals, the candidate payload size is probable DCI payload size configured for the terminal.

Step 82: transmitting a DCI corresponding to the indication information to the terminal by a physical downlink control channel (PDCCH).

After the network device configures and transmits the indication information for indicating the candidate DCI payload size, the DCI to be transmitted is padded to the DCI payload size indicated by the indication information, and then is transmitted to the terminal. Since the network device transmits the indication information to the terminal in advance, when the terminal performs blind detection, the terminal may perform blind detection on the PDCCH according to the probable DCI payload size, to determine DCI transmitted in the PDCCH. In this way, blind detection is performed according to the probable DCI payload size indicated by the indication information, and blind detection is not performed according to all supported DCI payload sizes, which can reduce the number of blind detection, the blind detection complexity and blind detection calculation amount.

The step 81 specifically includes: configuring a candidate DCI payload size for each terminal; and transmitting first indication information to the terminal according to the configured DCI payload size. The first indication information is used to indicate at least one candidate DCI payload size corresponding to the terminal, or the first indication information is used to indicate at least one candidate DCI payload size corresponding to each control resource set of the terminal.

Specifically, in the NR system, the supported DCI formats are more than the DCI formats in the LTE system. Accordingly, DCI information bits supported by different DCI formats in the NR system may also increase. The network device may configure a set of candidate DCI payload sizes for each terminal, or the network device may configure a set of candidate DCI payload sizes for each control resource set of each terminal.

When CORESET configuration, DCI format, and DCI information bits of the terminal are changed, the network device and the terminal may determine one or more default DCI payload sizes corresponding to the terminal by means of predefined agreement, pre-configuration, or the like. The network device may transmit default DCI payload size carried in first indication information to the terminal. That is, the first indication information is further used to indicate at least one default DCI payload size. Specifically, the step of transmitting the first indication information to the terminal includes: transmitting, by high layer signaling, the first indication information to the terminal.

Further, before the step 82, the method further includes: configuring an indication field in the DCI. The indication field is used to indicate the DCI format of the DCI. The step of configuring the indication field in the DCI specifically includes: configuring a specific target field in the DCI, and/or, configuring information in the CRC field in the DCI after scrambling.

Specifically, the step of configuring the indication field in the DCI includes: obtaining a correspondence relationship between the candidate DCI payload size and the DCI format; and, configuring bit number of the indication field in the DCI according to number information of the DCI format corresponding to the candidate DCI payload size indicated by the indication information.

Further, the step of obtaining a correspondence relationship between the candidate DCI payload size and the DCI format includes: obtaining first correspondence information in a predefined manner. The first correspondence information is used to indicate correspondence relationship between all candidate DCI payload sizes and DCI formats.

After the step of obtaining a correspondence relationship between the candidate DCI payload size and the DCI format, the method further includes: transmitting second correspondence information to the terminal. The second correspondence information is used to indicate a correspondence relationship between the candidate DCI payload size indicated by the indication information and the DCI format.

In the downlink control information transmitting method of the embodiment of the present disclosure, the network device configures the indication information for indicating the candidate DCI payload size for the terminal, and transmits the indication information to the terminal, and transmits DCI corresponding to the indication information to the terminal through corresponding PDCCH. In this way, when the terminal performs PDCCH blind detection, the terminal can perform PDCCH blind detection according to the candidate DCI payload size indicated by the indication information, thereby reducing the number of blind detection and reducing the blind detection complexity The above embodiment describes the downlink control information transmitting method in different scenarios. The network device corresponding thereto will be further introduced hereinafter with reference to the accompanying drawings.

Figure 9:
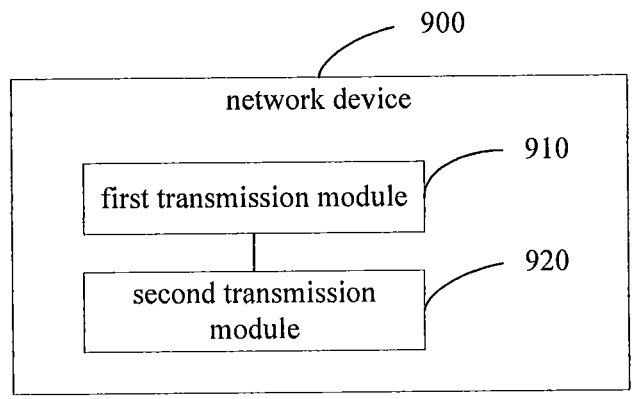
FIG. 9 is a schematic block diagram of a network device according to an embodiment of the present disclosure.

As shown in FIG. 9, the network device 900 of the embodiment of the present disclosure can implement details of the method in the above embodiment and achieve the same effects, i.e., transmitting indication information for indicating candidate downlink control information (DCI) payload size to a terminal, and transmitting a DCI corresponding to the indication information to the terminal by a physical downlink control channel (PDCCH). The network device 900 specifically includes the following functional modules.

A first transmission module 910 is used to transmit indication information for indicating candidate downlink control information (DCI) payload size to a terminal.

A second transmission module 920 is used to transmit a DCI corresponding to the indication information to the terminal by a physical downlink control channel (PDCCH).

The first transmission module 910 includes:

a first configuration submodule used to configure a respective candidate DCI payload size for different terminals;

a first transmission submodule, used to transmit first indication information to the terminal according to the configured DCI payload size. The first indication information is used to indicate at least one candidate DCI payload size corresponding to the terminal, or the first indication information is used to indicate at least one candidate DCI payload size corresponding to each control resource set of the terminal.

The first transmission submodule is specifically configured to transmit the first indication information to the terminal by high-layer signaling.

The first indication information is further used to indicate at least one default DCI payload size.

The network device 900 further includes:

a first configuration module used to configure an indication field in the DCI, where the indication field is used to indicate a DCI format of the DCI.

The first configuration module includes:

a second configuration submodule used to configure a specific target field in the DCI;

and/or, a third configuration submodule used to configure information carried in the CRC field in the DCI after scrambling.

The network device 900 further includes:

a third obtaining module, used to obtain a correspondence relationship between the candidate DCI payload size and the DCI format;

a second configuration module, used to configure bit number of the indication field in the DCI according to number information of the DCI format corresponding to the candidate DCI payload size indicated by the indication information.

The third obtaining module is specifically used to: obtain first correspondence information in a predefined manner. The first correspondence information is used to indicate correspondence relationship between all candidate DCI payload sizes and DCI formats.

The network device 900 further includes:

a third transmission module used to transmit second correspondence information to the terminal, where the second correspondence information is used to indicate a correspondence between the candidate DCI payload size indicated by the indication information and the DCI format.

It should be noted that division of various modules of the above network device and terminal is only a division of logical functions. In actual implementation, they may be integrated into one physical entity in whole or in part, or may be physically separated. All of these modules may be implemented in the form of software calling by processing components; or all of them may be implemented in form of hardware. Some modules may be implemented in the form of software calling by processing components while some modules may be implemented in form of hardware. For example, the determining module may be a separately processing component, or may be integrated in a chip of one of the above-mentioned devices. In addition, the determining module may be in form of program codes stored in the memory of the above device, and may be called by one processing component of the above device to perform functions of the determining module. Other modules are implemented in a similar way. In addition, all or part of these modules may be integrated or implemented independently. The processing components described herein may be an integrated circuit that has signal processing capabilities. In the implementation process, each step of the above method or each of the above modules may be completed by an integrated logic circuit of hardware in the processing component or an instruction in form of software.

For example, the above modules may be one or more integrated circuits configured to implement the above method, such as one or more Application Specific Integrated Circuits (ASICs), or one or more digital signal processors (DSPs), or one or more Field Programmable Gate Arrays (FPGAs). For another example, when one of the above modules is implemented in the form of program codes called by a processing component, the processing component may be a general purpose processor, such as a central processing unit (CPU) or other processor that can call the program code. As another example, these modules may be integrated and implemented in the form of a system-on-a-chip (SOC).

It is to be noted that the network device in the embodiment of the present disclosure configures the indication information for indicating the candidate DCI payload size for the terminal, and transmits the indication information to the terminal, and transmits the DCI corresponding to the indication information to the terminal through the corresponding PDCCH. In this way, when the terminal performs PDCCH blind detection, the terminal can perform PDCCH blind detection according to the candidate DCI payload size indicated by the indication information, thereby reducing the number of blind detection and reducing the blind detection complexity.

In order to better achieve the above object, an embodiment of the present disclosure further provides a network device, including a processor, a memory, and a computer program stored on the memory and executable on the processor. The processor executes the computer program to implement steps of the downlink control information transmitting method as described above. An embodiment of the present disclosure also provides a computer readable storage medium including a computer program stored thereon. When the computer program is executed by a processor, the steps of the downlink control information transmitting method as described above are implemented.

Figure 10:
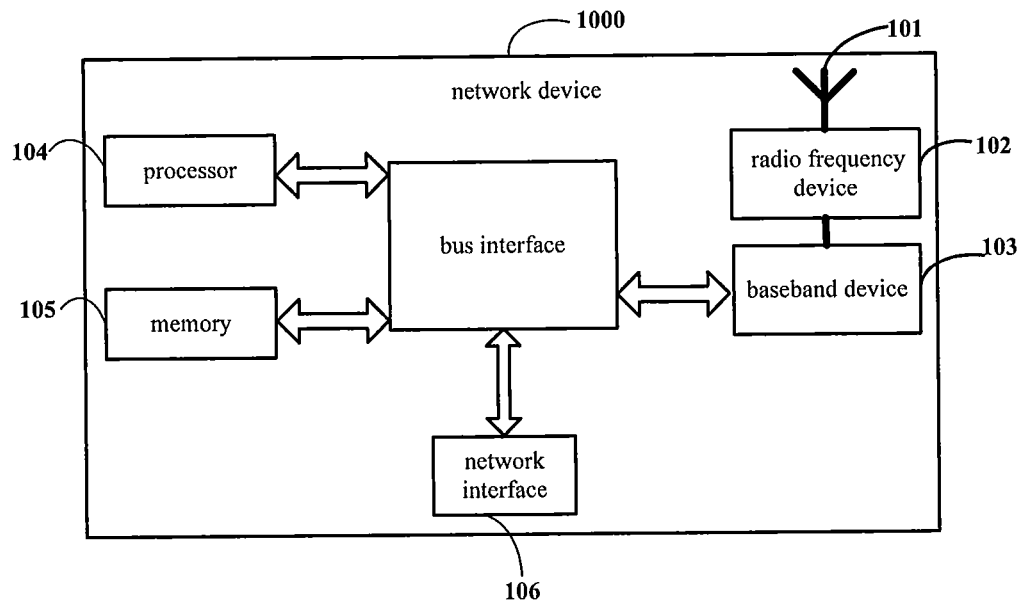
FIG. 10 is a block diagram of a network device according to an embodiment of the present disclosure.

Specifically, an embodiment of the present disclosure further provides a network device. As shown in FIG. 10, the network device 1000 includes an antenna 101, a radio frequency device 102, and a baseband device 103. The antenna 101 is coupled to the radio frequency device 102. In the uplink direction, the radio frequency device 102 receives information through the antenna 101, and transmits the received information to the baseband device 103 for processing. In the downlink direction, the baseband device 103 processes the information to be transmitted and transmits it to the radio frequency device 102. The radio frequency device 102 processes the received information and transmits it via the antenna 101.

The method performed by the network device in the above embodiment may be implemented in the baseband device 103. The baseband device 103 includes a processor 1104 and a memory 105.

The baseband device 103 may include, for example, at least one baseband board on which a plurality of chips are disposed. As shown in FIG. 10, one of the chips is, for example, a processor 104, which is coupled to the memory 105 to call a program in the memory 105 to execute operation performed by the network device in the above method embodiment.

The baseband device 103 may also include a network interface 106 for interacting with the radio frequency device 102. For example, the interface may be a common public radio interface (CPRI).

The processor herein may be a processor or a collective name of multiple processing components. For example, the processor may be a CPU, an ASIC, or one or more integrated circuits configured to implement the method performed by the above network device, such as one or more microprocessor DSPs, or one or more field programmable gate array FPGAs. The memory may be a memory or a collective name for a plurality of storage elements.

The memory 105 may be volatile memory or non-volatile memory, or include both volatile memory and non-volatile memory. The non-volatile memory may be a Read-Only Memory (ROM), a Programmable ROM (PROM), or an Erasable PROM (EPROM), electrically EPROM (EEPROM) or flash memory. The volatile memory may be a Random Access Memory (RAM), which is used as an external cache. By way of example and not limitation, many forms of RAM are available, such as static random access memory (SRAM), dynamic RAM (DRAM), synchronous DRAM (SDRAM), double data rate SDRAM (DDRSDRAM), Enhanced SDRAM (ESDRAM), Synchlink DRAM (SLDRAM), and Direct Rambus RAM (DRRAM). The memory 105 described herein is intended to include, without being limited to, these and any other suitable types of memory.

Specifically, the network device of the embodiment of the present disclosure further includes: a computer program stored on the memory 105 and executable on the processor 104. The processor 104 calls the computer program in the memory 105 to execute the method executed by each module shown in FIG. 9.

Specifically, when the computer program is called by the processor 104, the processor 104 is to perform: transmitting indication information for indicating candidate downlink control information (DCI) payload size to a terminal;

transmitting a DCI corresponding to the indication information to the terminal by a physical downlink control channel (PDCCH).

Specifically, when the computer program is called by the processor 104, the processor 104 is to perform: configuring a respective candidate DCI payload size for different terminals;

transmitting first indication information to the terminal according to the configured DCI payload size, where the first indication information is used to indicate at least one candidate DCI payload size corresponding to the terminal, or the first indication information is used to indicate at least one candidate DCI payload size corresponding to each control resource set of the terminal.

Specifically, when the computer program is called by the processor 104, the processor 104 is to perform: transmitting the first indication information to the terminal by high-layer signaling.

The first indication information is used to indicate at least one default DCI payload size.

Specifically, when the computer program is called by the processor 104, the processor 104 is to perform: configuring an indication field in the DCI. The indication field is used to indicate the DCI format of the DCI.

The step of configuring the indication field in the DCI includes:

configuring a specific target field in the DCI, and/or, configuring information in the CRC field in the DCI after scrambling.

Specifically, when the computer program is called by the processor 104, the processor 104 is to perform: obtaining a correspondence relationship between the candidate DCI payload size and the DCI format;

configuring bit number of the indication field in the DCI according to number information of the DCI format corresponding to the candidate DCI payload size indicated by the indication information.

Specifically, when the computer program is called by the processor 104, the processor 104 is to perform: obtaining first correspondence information in a predefined manner. The first correspondence information is used to indicate correspondence relationship between all candidate DCI payload sizes and DCI formats.

Specifically, when the computer program is called by the processor 104, the processor 104 is to perform: transmitting second correspondence information to the terminal. The second correspondence information is used to indicate a correspondence relationship between the candidate DCI payload size indicated by the indication information and the DCI format.

The network device may be a base Transceiver Station (BTS) in the Global System of Mobile communication (GSM) or the Code Division Multiple Access (CDMA), a NodeB (NB) in the Wideband Code Division Multiple Access (WCDMA), an Evolutional Node B (eNB or eNodeB) in LTE, or a relay station or an access point, or a base station in the future 5G network, which are not limited herein.

The network device in the embodiment of the present disclosure configures the indication information for indicating the candidate DCI payload size for the terminal, and transmits the indication information to the terminal, and transmits the DCI corresponding to the indication information to the terminal through the corresponding PDCCH. In this way, when the terminal performs PDCCH blind detection, the terminal can perform PDCCH blind detection according to the candidate DCI payload size indicated by the indication information, thereby reducing the number of blind detection and reducing the blind detection complexity.

Persons having ordinary skill in the art may learn that, units and algorithm blocks of each example described by embodiments of the application may be implemented in electronic hardware, or in a combination of computer software and electronic hardware. Whether these functions are performed by hardware or software depends on specific application and design constraints of technical solutions. For each specific application, a person skilled in the art may adopt a different method to implement the described functions. However, such implementation should not be considered to go beyond the scope of the application.

Persons having ordinary skill in the art may clearly learn that, for convenience and conciseness of description, the specific working process of above-described system, device and unit may refer to corresponding process of foregoing method embodiments, which is not repeated here.

In the embodiments of the application, it should be understood that, the disclosed devices and methods may be implemented with other methods. For example, the above-described device embodiments are only illustrative, e.g., the division of the unit is only a logic function division. In practical implementation, there may be another division method. For example, multiple units or components may be combined, or integrated into another system, or some features may be omitted, or not executed. From another point, the mutual coupling or direct coupling, or communication connection shown or discussed may be indirect coupling, or communication connections through some interfaces, devices, or units, which may be electronic, mechanical, or in other form.

Units described as separate components may be, or may be not physically separate. A component displayed as a unit may be, or may be not a physical unit, that is, it may be located in one place, or may be distributed to multiple network units. According to practical requirements, some units or all the units may be selected to implement the objective of solutions in the embodiments of the application.

In addition, in each embodiment of the present disclosure, various functional units may be integrated into a processing unit. Alternatively, each unit physically exists alone. Still alternatively, two or more units may be integrated into one unit.

When the functions are implemented in the form of software functional unit, which is sold or used as an independent product, such software functional unit may be stored in a computer readable storage medium. Based on such understandings, the technical solution of the present disclosure, or, a part contributing to the related art, or a part of the technical solution may be embodied in the form of a software product. The computer software produce is stored in one storage medium, including several instructions to enable a computer device (may be a Personal Computer (PC), a server, or a network device, etc.) to implement all the blocks, or some blocks in the method of each embodiment of the present disclosure. Foregoing storage medium includes various media that can store program codes, such as a U disk, a mobile hard disk, an ROM, an RAM, a disk, or a Compact Disk (CD), and so on.

In addition, it should be noted that in the device and method of the present disclosure, it is apparent that various components or steps may be decomposed and/or recombined. These decomposition and/or recombination should be considered as equivalents to the present disclosure. Also, the steps of performing the above series of processing can be performed naturally in chronological order according to the order of description, but need not necessarily be performed in chronological order, some steps may be performed in parallel or independently of each other. It will be appreciated by those skilled in the art that all or any steps or components of the methods and devices of the present disclosure may be implemented in any computing device (including a processor, a storage medium, etc.) or a network of computing devices in hardware, firmware, software or a combination thereof. This can be achieved by one of ordinary skill in the art by using their basic programming skills after reading the description of the present disclosure.

Thus, the object of the present disclosure may also be achieved by running a program or a group of programs on any computing device. The computing device may be a well-known general-purpose device. Therefore, the object of the present disclosure may also be achieved only by providing a program product including a program code for implementing the method or device. That is, such a program product also constitutes the present disclosure, and a storage medium storing such a program product also constitutes the present disclosure. Apparently, the storage medium may be any known storage medium or any storage medium developed in the future. It should also be noted that, in the device and method of the present disclosure, it is apparent that various components or steps may be decomposed and/or recombined. These decomposition and/or recombination should be considered as equivalents to the present disclosure. Also, the steps of performing the above series of processing can be performed naturally in chronological order according to the order of description, but need not necessarily be performed in chronological order, some steps may be performed in parallel or independently of each other.

The foregoing are only optional embodiments of the present disclosure. It should be noted that those skilled in the art may make several improvements and modifications without departing from the principles of the present disclosure, which are also covered by this disclosure.

What is claimed is:

1. A downlink control information detecting method, applied to a terminal, comprising:
    obtaining indication information for indicating a candidate downlink control information (DCI) payload size; and
    according to the candidate DCI payload size indicated by the indication information, performing blind detection on a physical downlink control channel (PDCCH) and determining DCI transmitted in the PDCCH;
    wherein the step of according to the candidate DCI payload size indicated by the indication information, performing blind detection on a physical downlink control channel (PDCCH) and determining DCI transmitted in the PDCCH, comprises:
    performing blind detection on the PDCCH according to the candidate DCI payload size indicated by the indication information, to obtain a bit string;
    parsing an indication field in the bit string, and determining a DCI format of DCI transmitted in the PDCCH according to a parsing result; and
    parsing DCI carried in the bit string according to the DCI format.

2. The method according to claim 1, wherein the step of obtaining indication information for indicating a candidate downlink control information (DCI) payload size, comprises:
    receiving first indication information that is configured and transmitted by a network device; wherein the first indication information is used to indicate at least one candidate DCI payload size corresponding to the terminal, or the first indication information is used to indicate at least one candidate DCI payload size corresponding to each control resource set of the terminal;
    wherein the step of performing blind detection on a physical downlink control channel (PDCCH), comprises:
    performing PDCCH blind detection in the corresponding control resource set.

3. The method according to claim 2, wherein the step of receiving first indication information that is configured and transmitted by a network device, comprises:
    receiving, by high layer signaling, the first indication information that is configured and transmitted by the network device.

4. The method according to claim 2, wherein the first indication information is further used to indicate at least one default DCI payload size.

5. The method according to claim 1, wherein the step of parsing an indication field in the bit string, and determining a DCI format of DCI transmitted in the PDCCH according to a parsing result, comprises:
    parsing a specific target field in the bit string, and determining the DCI format of the DCI transmitted in the PDCCH according to a parsing result; or,
    wherein the step of parsing an indication field in the bit string, and determining a DCI format of DCI transmitted in the PDCCH according to a parsing result, comprises:
    descrambling a cyclic redundancy check (CRC) field in the bit string by means of CRC, determining whether the bit string comprises a specific target field;
    when the bit string does not comprise the specific target field, determining that DCI format of the DCI transmitted in the PDCCH is default DCI format;
    when the bit string comprises the specific target field, parsing the specific target field in the bit string, and determining DCI format of the DCI transmitted in the PDCCH according to a parsed result; or, wherein the step of parsing an indication field in the bit string, and determining a DCI format of DCI transmitted in the PDCCH according to a parsing result, comprises:

parsing a specific target field in the bit string and descrambling a cyclic redundancy check (CRC) field in the bit string by means of CRC, and determining DCI format of the DCI transmitted in the PDCCH; or, wherein the step of parsing an indication field in the bit string, and determining a DCI format of DCI transmitted in the PDCCH according to a parsing result, comprises:

obtaining a correspondence relationship between the candidate DCI payload size and the DCI format;

determining the indication field in the bit string according to the correspondence relationship;

parsing the indication field and determining the DCI format of the DCI transmitted in the PDCCH according to a parsing result.

6. The method according to claim 3, wherein the step of obtaining a correspondence relationship between the candidate DCI payload size and the DCI format, comprises:

obtaining first correspondence relationship information in a predefined manner; wherein the first correspondence relationship information is used to indicate correspondence relationship between all candidate DCI payload sizes and DCI formats;

or, receiving second correspondence information that is configured and transmitted by the network device; wherein the second correspondence information is used to indicate a correspondence relationship between the candidate DCI payload size indicated by the indication information and the DCI format.

7. The method according to claim 5, wherein the step of determining the indication field in the bit string according to the correspondence relationship, comprises:

according to the candidate DCI payload size indicated by the indication information, determining a first candidate DCI payload size of the DCI transmitted in the PDCCH;

according to the correspondence relationship between the candidate DCI payload size and the DCI format, determining number information of first format corresponding to the first candidate DCI payload size;

according to the number information, determining bit number of the indication field in the bit string.

8. The method according to claim 1, wherein the step of parsing an indication field in the bit string, and determining a DCI format of DCI transmitted in the PDCCH according to a parsing result, comprises:

descrambling a cyclic redundancy check (CRC) field in the bit string by means of CRC, and determining the DCI format of the DCI transmitted in the PDCCH according to a descrambling result.

9. The method according to claim 8, wherein after the step of descrambling a cyclic redundancy check (CRC) field in the bit string by means of CRC, and determining the DCI format of the DCI transmitted in the PDCCH according to a descrambling result, the method further comprises:

parsing a specific target field in the bit string, and determining whether the DCI format is correct according to a parsing result;

the step of parsing DCI carried in the bit string according to the DCI format comprises:

parsing the DCI carried in the bit string according to the DCI format when determining that the DCI format is correct according to a parsing result.

10. A terminal comprising: a processor, a memory and a computer program stored on the memory and executable on the processor; wherein the computer program is executed by the processor to implement steps of:

obtaining indication information for indicating a candidate downlink control information (DCI) payload size; and according to the candidate DCI payload size indicated by the indication information, performing blind detection on a physical downlink control channel (PDCCH) and determining DCI transmitted in the PDCCH;

wherein when performing blind detection on a physical downlink control channel (PDCCH) and determining DCI transmitted in the PDCCH according to the candidate DCI payload size indicated by the indication information the computer program is executed by the processor to implement steps of:

performing blind detection on the PDCCH according to the candidate DCI payload size indicated by the indication information, to obtain a bit string;

parsing an indication field in the bit string and determining a DCI format of DCI transmitted in the PDCCH according to a parsing result; and parsing DCI carried in the bit string according to the DCI format.

11. The terminal according to claim 10, wherein when parsing an indication field in the bit string and determining a DCI format of DCI transmitted in the PDCCH according to a parsing result, the computer program is executed by the processor to implement steps of: parsing a specific target field in the bit string, and determining the DCI format of the DCI transmitted in the PDCCH according to a parsing result;

or, wherein when parsing an indication field in the bit string and determining a DCI format of DCI transmitted in the PDCCH according to a parsing result, the computer program is executed by the processor to implement steps of:

descrambling a cyclic redundancy check (CRC) field in the bit string by means of CRC, determining whether the bit string comprises a specific target field;

when the bit string does not comprise the specific target field, determining that DCI format of the DCI transmitted in the PDCCH is default DCI format;

when the bit string comprises the specific target field, parsing the specific target field in the bit string, and determining DCI format of the DCI transmitted in the PDCCH according to a parsed result;

or, wherein when parsing an indication field in the bit string and determining a DCI format of DCI transmitted in the PDCCH according to a parsing result, the computer program is executed by the processor to implement steps of: parsing a specific target field in the bit string and descrambling a cyclic redundancy check (CRC) field in the bit string by means of CRC, and determining DCI format of the DCI transmitted in the PDCCH;

or, wherein when parsing an indication field in the bit string and determining a DCI format of DCI transmitted in the PDCCH according to a parsing result, the computer program is executed by the processor to implement steps of:

obtaining a correspondence relationship between the candidate DCI payload size and the DCI format;

determining the indication field in the bit string according to the correspondence relationship;

parsing the indication field and determining the DCI format of the DCI transmitted in the PDCCH according to a parsing result.

12. The terminal according to claim 11, wherein when parsing an indication field in the bit string and determining a DCI format of DCI transmitted in the PDCCH according to a parsing result, the computer program is executed by the processor to implement steps of:

descrambling a cyclic redundancy check (CRC) field in the bit string by means of CRC, and determining the DCI format of the DCI transmitted in the PDCCH according to a descrambling result.

13. The terminal according to claim 12, wherein after descrambling a cyclic redundancy check (CRC) field in the bit string by means of CRC, and determining the DCI format of the DCI transmitted in the PDCCH according to a descrambling result, the computer program is executed by the processor to implement steps of:

parsing a specific target field in the bit string, and determining whether the DCI format is correct according to a parsing result;

the step of parsing DCI carried in the bit string according to the DCI format comprises:

parsing the DCI carried in the bit string according to the DCI format when determining that the DCI format is correct according to a parsing result.

14. The terminal to claim 11, wherein when obtaining a correspondence relationship between the candidate DCI payload size and the DCI format, the computer program is executed by the processor to implement steps of:

obtaining first correspondence relationship information in a predefined manner; wherein the first correspondence relationship information is used to indicate correspondence relationship between all candidate DCI payload sizes and DCI formats;

or, receiving second correspondence information that is configured and transmitted by the network device; wherein the second correspondence information is used to indicate a correspondence relationship between the candidate DCI payload size indicated by the indication information and the DCI format.

15. A downlink control information transmitting method, applied to a network device, comprising:

transmitting indication information for indicating candidate downlink control information (DCI) payload size to a terminal; and transmitting a DCI corresponding to the indication information to the terminal by a physical downlink control channel (PDCCH);

wherein before the step of transmitting a DCI corresponding to the indication information to the terminal by a physical downlink control channel (PDCCH), the method further comprises:

configuring an indication field in the DCI; wherein the indication field is used to indicate the DCI format of the DLI;

wherein the step of configuring an indication field in the DCL, comprises;

obtaining a correspondence relationship between the candidate DCI payload size and the DCI format;

configuring bit number of the indication field in the DCI according to number information of the DCI format corresponding to the candidate IDC payload size indicated by the indication information.

16. The method according to claim 15, wherein the step of transmitting indication information for indicating candidate downlink control information (DCI) payload size to a terminal, comprises:

configuring a respective candidate DCI payload size for different terminals;

transmitting first indication information to the terminal according to the configured DCI payload size; wherein the first indication information is used to indicate at least one candidate DCI payload size corresponding to the terminal, or the first indication information is used to indicate at least one candidate DCI payload size corresponding to each control resource set of the terminal;

wherein the terminal performs PDCCH blind detection in the corresponding control resource set.

17. The method according to claim 16, wherein the step of transmitting first indication information to the terminal, comprises:

transmitting, by high layer signaling, the first indication information to the terminal.

18. The method according to claim 15, wherein the step of configuring an indication field in the DCI, comprises:

configuring a specific target field in the DCI; and/or, configuring information in a cyclic redundancy check (CRC) field in the DCI after scrambling.

19. The method according to claim 15, wherein the step of obtaining a correspondence relationship between the candidate DCI payload size and the DCI format, comprises:

obtaining first correspondence information in a predefined manner; wherein the first correspondence information is used to indicate correspondence relationship between all candidate DCI payload sizes and DCI formats.

20. The method according to claim 15, wherein after the step of obtaining a correspondence relationship between the candidate DCI payload size and the DCI format, the method further comprises:

transmitting second correspondence information to the terminal; wherein the second correspondence information is used to indicate a correspondence relationship between the candidate DCI payload size indicated by the indication information and the DCI format.

* * * * *